United States Patent
Bagheri et al.

(10) Patent No.: US 11,864,222 B2
(45) Date of Patent: Jan. 2, 2024

(54) METHOD AND APPARATUS FOR TRANSMITTING A HIGH PRIORITY UPLINK TRANSMISSION

(71) Applicant: Lenovo (Singapore) Pte. Ltd., New Tech Park (SG)

(72) Inventors: Hossein Bagheri, Urbana, IL (US); Vijay Nangia, Woodridge, IL (US); Hyejung Jung, Northbrook, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 41 days.

(21) Appl. No.: 17/743,409

(22) Filed: May 12, 2022

(65) Prior Publication Data
US 2022/0272714 A1    Aug. 25, 2022

Related U.S. Application Data

(63) Continuation of application No. 16/725,482, filed on Dec. 23, 2019, now Pat. No. 11,357,017.

(60) Provisional application No. 62/791,672, filed on Jan. 11, 2019.

(51) Int. Cl.
| | | |
|---|---|---|
| *H04W 72/56* | (2023.01) | |
| *H04W 76/27* | (2018.01) | |
| *H04L 1/00* | (2006.01) | |
| *H04L 5/00* | (2006.01) | |
| *H04L 25/02* | (2006.01) | |
| *H04W 72/0453* | (2023.01) | |
| *H04W 72/23* | (2023.01) | |

(52) U.S. Cl.
CPC .......... *H04W 72/56* (2023.01); *H04L 1/0068* (2013.01); *H04L 5/0051* (2013.01); *H04L 25/0226* (2013.01); *H04W 72/0453* (2013.01); *H04W 72/23* (2023.01); *H04W 76/27* (2018.02)

(58) Field of Classification Search
CPC . H04W 72/56; H04W 72/0453; H04W 72/23; H04W 76/27; H04W 72/569; H04L 1/0068; H04L 5/0051; H04L 25/0226
See application file for complete search history.

(56) References Cited

U.S. PATENT DOCUMENTS

2018/0262311 A1* 9/2018 Wang ................ H04W 72/14
2019/0222362 A1* 7/2019 Beale ................ H04L 1/1861

OTHER PUBLICATIONS

Qualcomm Incorporated, eMBB and URLLC dynamic multiplexing and preemption indication on the uplink, 3GPP TSG-RAN WG1 #92b, Apr. 16-Apr. 20, 2018, Sanya, China, R1-1804820 (Year: 2018).*

(Continued)

*Primary Examiner* — Shailendra Kumar
(74) *Attorney, Agent, or Firm* — Loppnow & Chapa; Matthew C. Loppnow

(57) ABSTRACT

An ULCI DCI with a group-common DCI format for a serving cell can be received. The ULCI DCI can indicate a group of symbols and a group of PRBs. In response to receiving the DCI, a PUSCH transmission or an SRS transmission on the serving cell can be cancelled if the PUSCH transmission is with low priority based on the device being provided a RRC indication indicating ULCI is only applicable to UL transmissions with low priority level, if the group of symbols includes a symbol of the PUSCH or of the SRS transmission, and if the group of PRBs includes a PRB of the PUSCH or of the SRS transmission.

19 Claims, 8 Drawing Sheets

(56) References Cited

OTHER PUBLICATIONS

VIVO, Summary of handling UL multiplexing of transmission with different reliability requirements, 3GPP TSG-RAN WG1 #92b, Apr. 16-Apr. 20, 2018, Sanya, China, R1-1805629 (Year: 2018).*
Fujitsu, On eMMB and URLL Multiplexing, 3GPP TSG RAN WG1 Meeting #91, Reno, USA, Nov. 27-Dec. 1, 2017, R1-1719616 (Year: 2017).*
MediaTek, Inc., On UL multiplexing of transmissions with different reliability targets, 3GPP TSG RAN WG1 Meeting #92, Athens, Greece, Feb. 26-Mar. 2, 2018, R1-1801674 (Year: 2018).*

* cited by examiner

METHOD AND APPARATUS FOR TRANSMITTING A HIGH PRIORITY UPLINK TRANSMISSION

BACKGROUND

1. Field

The present disclosure is directed to a method and apparatus for transmitting a high priority Uplink (UL) transmission.

2. Introduction

Presently, wireless communication devices, such as User Equipment (UE), communicate with other communication devices using wireless signals. Dynamic multiplexing between enhanced Mobile Broadband (eMBB) and Ultra-Reliable Low Latency Communication (URLLC) traffic in the Downlink DL was specified in Third Generation Partnership Project (3GPP) Rel-15 standard specifications. However, how to multiplex UL traffic from UE and/or system perspective is still open.

For Downlink Pre-Emption Indication (DLPI), Downlink Control Information (DCI) format 2_1 is used for notifying the Physical Resource Block(s) (PRB(s)) and Orthogonal Frequency Division Multiplexing (OFDM) symbol(s) where UE may assume no transmission is intended for the UE. The following information can be transmitted by means of the DCI format 2_1 with Cyclic Redundancy Check (CRC) scrambled by Interrupted Transmission Radio Network Temporary Identifier (INT-RNTI): Pre-emption indication 1, Pre-emption indication 2, . . . , Pre-emption indication N. The size of DCI format 2_1 is configurable by higher layers up to 126 bits, according to Subclause 11.2 of Technical Specification (TS) 38.213. Each pre-emption indication is 14 bits. Interpretation of the 14-bit bitmap is configurable. Each bit represents either one OFDM symbol in the time domain and the full bandwidth part in frequency domain, or two OFDM symbols in the time domain and one half of the bandwidth part in frequency domain. UE behavior upon DLPI reception is undefined.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

At least some embodiments provide a method and apparatus for transmitting a high priority UL transmission. At least some embodiments can also provide systems and methods for traffic multiplexing. At least some embodiments can also provide a method and apparatus for traffic multiplexing from a user/device perspective, also referred to as intra UE multiplexing, and/or from network perspective, also referred to as inter UE multiplexing. At least some embodiments can also provide for UE behavior when the UE receives an ULPI for its eMBB UL transmission and URLLC UL traffic for the UE arrives, such as for UL transmission from the UE. At least some embodiments can also provide for the impact on the UE's SRS transmission when the UE receives an ULPI for its eMBB UL transmission.

According to a possible embodiment, a first indication that indicates a time frequency region can be received. A second indication indicating the priority of an UL transmission in a set of time frequency resources as a high priority UL transmission can be received. Whether at least a portion of the set of time frequency resources of the high priority UL transmission overlaps with the indicated time frequency region can be determined. Whether to transmit the high priority UL transmission if at least the portion of the set of time frequency resources of the high priority UL transmission overlaps with the indicated time frequency region can be determined. The high priority UL transmission can be transmitted based on determining whether to transmit the high priority UL transmission.

Figure 1:
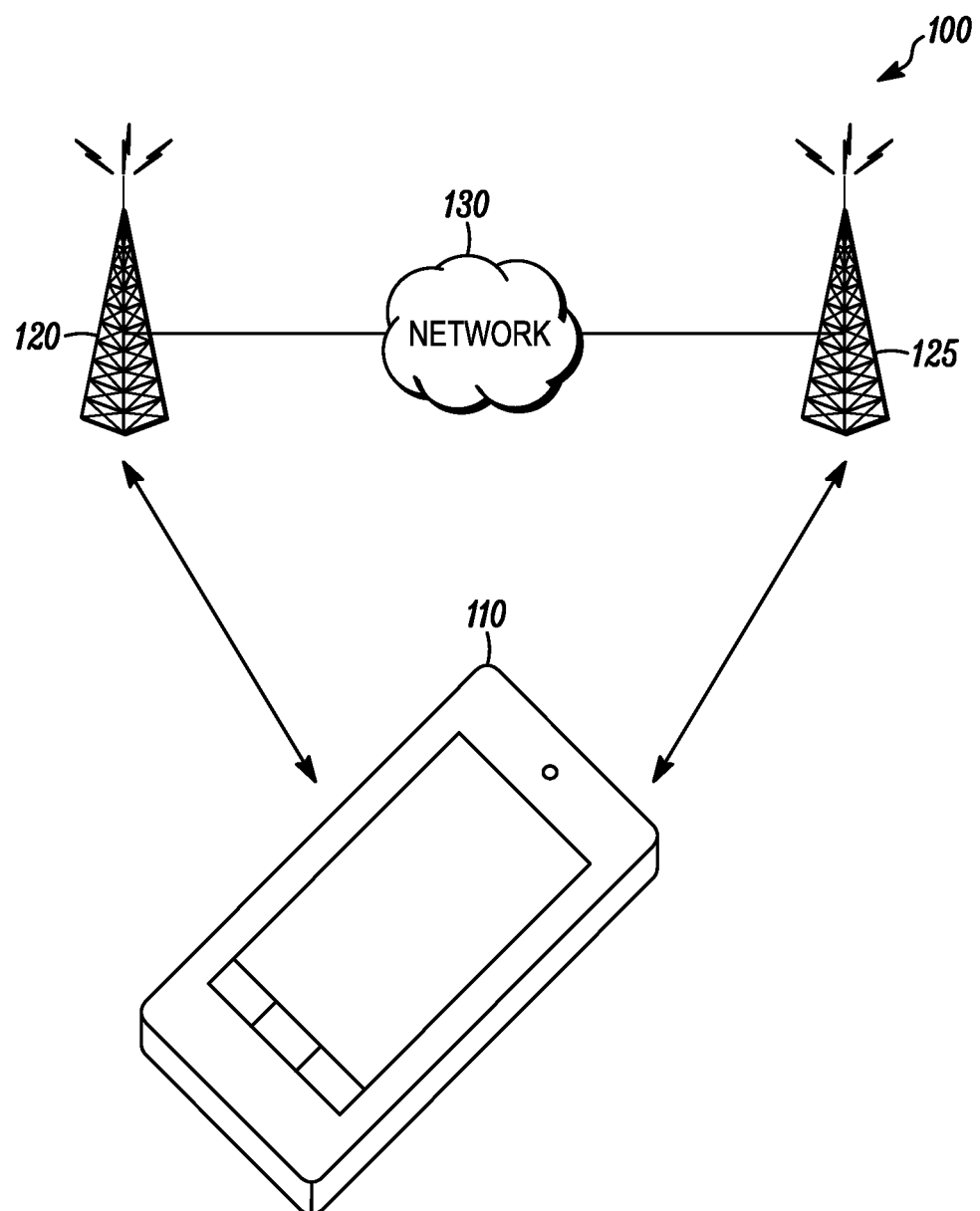
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission/Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel. In a case of the presence of URLLC and eMBB traffic in a system, the network, such as the network entity 120, can send an indication, such as an ULPI, which can also be called an Uplink Cancellation Indication (ULCI), to a first UE, such as the UE 110, scheduled for eMBB UL transmission in a first set of resources to suspend/cancel its UL transmission in at least a subset of the first set of resources. This enables a second UE with URLLC UL traffic to transmit in a second set of resources, where the first and the second set of resources overlap.

As opposed to DLPI, where the number of Resource Blocks (RBs) in the frequency domain can change abruptly from one symbol to another symbol, in ULPI such abrupt changes are not desired because of Radio-Frequency (RF) limitations. Also, ULPI is different than DLPI as it is used to avoid UL interference, whereas in DL the base station, such as a gNodeB (gNB), has already avoided the DL interference by selecting one out of interfering DL transmissions.

UL cancellation, such as pre-emption, of an eMBB PUSCH transmission is used for inter UE multiplexing, such as in the presence of eMBB traffic of UE1 and URLLC traffic of UE2. This scheme ensures latency and reliability of the URLLC traffic by timely muting the eMBB traffic of another UE. The scheme lets eMBB UEs be scheduled over a wide bandwidth instead of a semi-static bandwidth split between URLLC UEs and eMBB UEs, as the UEs may only get muted if needed. However, there may be costs associated with the scheme. One possible issue is the UL cancellation indication, if explicitly indicated, may need to be monitored quite frequently, at least when the UE has unacknowledged UL eMBB transmission or configured wideband SRS transmission, in a timely manner to be helpful in ensuring latency of URLLC UEs. One possible cost is the UL cancellation indication should have a high reliability. Another possible cost is the UL cancellation indication can incur control overhead. Another possible issue is there could be eMBB UEs in a cell that are not capable of performing UL cancellation operation, which could hurt the URLLC performance if there is overlap.

UL cancellation has been proposed with different flavors. One flavor can include completely cancelling eMBB PUSCH. Another flavor can include resuming eMBB PUSCH after cancelling a part of PUSCH, pausing eMBB PUSCH for a period. Another flavor can include rescheduling eMBB PUSCH.

An alternative scheme for inter UE multiplexing, can be boosting transmission power of URLLC UEs when there are overlapping eMBB transmission of other UEs. However, power boosting may not be applicable to power limited UEs or may lead to inter cell interference. A combination of UL cancellation, with some relaxation of cancellation indication, such as in terms of timeline and monitoring frequency, and power boosting may also be used to address inter UE multiplexing.

In some cases, using an UL cancellation indication may be possible, for instance, when all active eMBB UEs in a cell are capable of UL cancellation operation, when eMBB UEs that are not capable of UL cancellation operation are given non-overlapping resources with URLLC UEs, when eMBB UEs can also have URLLC traffic and hence would monitor for URLLC DCI, and/or when a hybrid cancellation-power boosting technique is used.

At least some embodiments can provide for handling intra and inter UE multiplexing. For example, at least some embodiments can provide methods for a UE to handle the scenario when the UE receives an ULPI for its eMBB UL transmission and URLLC UL traffic for the UE also arrives. Scenarios for at least some embodiments can also include when eMBB is transmitted in a wideband manner in the frequency domain, which can use ULPI for allowing more spectral efficient eMBB transmission.

Scenarios for at least some embodiments can also include when ULPI frequency indication is a coarse indication, which can be similar to DLPI. For example, the indication can indicate if a first half or a second half of the Bandwidth Part (BWP) is to be pre-empted. In another example, the indication can indicate that the whole BWP is pre-empted. The frequency indication can be an absolute indication, such as with respect to the active BWP, or can be a relative indication, such as relative to the allocated eMBB resources, such as when the active BWP is half or full of allocated eMBB resources.

Scenarios for at least some embodiments can also include when UL URLLC transmission overlaps with frequency resources indicated by the ULM/URLLC that may be wideband. For example, in a case of PUSCH hopping, a first hop of a UE's own URLLC transmission may overlap with another UE's first hop of URLLC transmission, but second hops may not overlap.

Scenarios for at least some embodiments can also include when ULPI may cancel more time domain resources than actually overlapped with another UE's URLLC, such as in a scenario where resuming eMBB PUSCH may be useless.

Scenarios for at least some embodiments can also include when UE's own UL URLLC can be a configured grant-PUSCH transmission, PUCCH corresponding to URLLC-Physical Downlink Shared Channel (PDSCH) transmission, and/or URLLC-PUSCH transmission dynamically granted by a grant that comes after ULPI transmission.

In a first example, the UE can receive an ULPI to cancel a scheduled, but not yet transmitted or already started, eMBB PUSCH transmission spanning from symbol 'x' to symbol y', referred to as duration x-y. At least some embodiments can cover scenarios where UL URLLC traffic, which can be a dynamically granted/configured grant PUSCH transmission or a PUCCH/Uplink Control Information (UCI) transmission, for the UE comes with a start of transmission target at symbol 'z' occurring during x-y.

In a first embodiment, the UE can start its UL URLLC transmission from symbol 'z'. In a second embodiment, the UE can start its UL URLLC transmission from symbol 'z' if the UE is indicated to start its UL URLLC transmission from symbol 'z'. The UE can be indicated to start the UL URLLC transmission via higher layer signaling, such as Radio Resource Control (RRC) configuration/Medium Access Control (MAC) Control Element (CE), or via physical layer signaling such as DCI. For example, the physical layer signaling can be indicated by the ULPI or in the DCI corresponding to the UL URLLC, including PUSCH DCI, such as a DCI scheduling a PUSCH or URLLC-PDSCH DCI, such as a DCI scheduling a PDSCH.

In an example of the second embodiment, the UE may be indicated the starting symbol, via ULPI, and/or a first URLLC priority, such as one of or a function of traffic class/MAC layer Quality of Service (QoS) parameters, such as a Logical Channel Identifier (LCID)/latency/reliability targets. If the UE's own UL URLLC transmission has a higher priority than the first priority, the UE can be allowed to transmit its UL URLLC traffic starting from symbol 'z'. For example, the UE's UL transmission priority can be determined based on traffic class/MAC layer QoS parameters, an LCID/latency/reliability targets of the URLLC packet, such as a Transport Block (TB), in the URLLC transmission, or otherwise determined. Otherwise, if the UE's UL transmission has a lower priority than the first priority, the UE may not be allowed to transmit its UL URLLC traffic starting from symbol 'z'.

In a related example, an RNTI, such as a Modulation and Coding Scheme-Radio Network Temporary Identifier (MCS-RNTI), for scrambling the CRC of the ULPI can indicate the priority associated with the underlying UL URLLC transmission resulting in muting the eMBB transmission. In a related example, an RNTI for scrambling the CRC of the DCI associated/corresponding to the UL URLLC transmission can indicate the priority associated with the underlying UL URLLC transmission, such as different values of MCS-RNTI, which can be configured for the UE.

In a related example, the UE can transmit its UL URLLC traffic starting from symbol 'w', where symbol 'w' can occur during x-y, and 'w' can be indicated by ULPI. Indicating 'w' can be used if the ULPI was sent to the UE due to multiple UL URLLC transmissions of other UEs having different priorities. For instance, if UE0 receives an ULPI to mute its eMBB transmission overlapping UL URLLC transmissions of UE1 with priority p1 spanning symbols 'z' to 'z+d1' and UE2 with priority p2 spanning symbols 'z+e1' to 'z+e2', where 'e1' can be a negative/non-negative integer, and e2>d1, and z+e2<=y, the ULPI can mute eMBB transmission up to 'z+e2' or up to 'y' and may indicate priorities 'p1', 'p2' and eMBB muting periods, such as period 1: up to w='z+d1' associated with 'p1' and period 2: up to 'z+e2'/'y' associated with 'p2'. For example, the ULPI can indicate UE0 to mute its eMBB transmission and the ULPI can indicate priorities 'p1', 'p2' and eMBB muting periods. Now, the UE0 can start its UL URLLC transmission from 'w' if its transmission has a priority lower than 'p1' but higher priority than 'p2'.

In a third embodiment, the UE can start its UL URLLC transmission from symbol 'z' if the corresponding DCI, such as URLLC-PUSCH DCI or URLLC-PDSCH DCI, has been received after the ULPI. In an implementation of the third embodiment, if the ULPI is sent multiple times in different time instances to a UE, such as to increase the reliability of the ULPI, the network, such as the gNB, can ensure that the transmission window of multiple transmissions of ULPI does not overlap, such as in the time domain, with the transmission window of the DCI, such as including URLLC-PUSCH DCI or URLLC-PDSCH DCI, corresponding to UL URLLC transmission of the UE. In an alternate example, the transmission window of URLLC DCI may overlap with the transmission window of ULPI, but can start after and/or end later than the transmission window of ULPI.

In another implementation of the third embodiment, the UE may have received a first grant for URLLC transmission before receiving the ULPI scheduling URLLC transmission starting symbol 'z'. For example, the UL grant can schedule URLLC transmission starting at symbol 'z.' In this implementation, the gNB can send a second grant for the URLLC transmission modifying the first grant along with ULPI, such as the same Physical Downlink Control Channel (PDCCH) or in a different PDCCH at the same time or at a later time. The second grant can regard when to start or change the transmit power or frequency allocation. For instance, gNB may delay URLLC transmission of the UE to a later symbol than 'z' inside x-y or outside x-y.

In another implementation of the third embodiment, if the UE has received a grant for UL URLLC transmission colliding with its UL eMBB transmission, the UE can transmit UL URLLC in the colliding symbols, such as based on the UL waveform. If the UE receives an ULPI after receiving the URLLC grant, the UE can use one or combination of the following methods.

According to a possible method, the ULPI can indicate if the URLLC should be dropped/transmitted in symbols colliding with the pre-empted period. According to a possible example, the eMBB can have a smaller BW than the URLLC, but the URLLC BW can be a super set of the eMBB BW.

According to another possible method, the UE can ignore the URLLC grant. The UE can only ignore a subset of URLLC transmissions, such as repetitions, that overlap with the x-y duration. According to another possible method, the UE can follow the URLLC grant for URLLC transmission.

According to another possible method, the UE can puncture/rate-match URLLC transmission around eMBB resources, such as in case of OFDM waveform. According to a possible example, the UE can transmit UL URLLC in one direction, such as either in RBs above/below the eMBB RBs. The choice of above or below eMBB RBs can be determined based on which one yields more RBs.

In another implementation of the third embodiment, the UE may not be expected to be indicated frequency resources overlapping pre-empted eMBB frequency resources if the URLLC grant comes after the ULPI. In another implementation of the third embodiment, if the UE receives an UL grant for URLLC transmission during x-y, after reception of an ULPI muting x-y period, the UE can or can be expected to search for an updated ULPI starting from the symbol it receives the UL URLLC grant. Alternately or also, the URLLC grant can indicate how to transmit URLLC in colliding symbols within x-y period, such as if eMBB frequency resources should be used or not for URLLC transmission.

In a fourth embodiment, the UE may not be allowed to start its UL URLLC transmission from symbol 'z'. In a first example of the fourth embodiment, the UE can skip/drop its UL URLLC transmission, which can be one or more of PUSCH/PUCCH repetitions or other UL transmissions. In this example, the UE can start an autonomous retransmission, such as in configured grant resources, when there is no overlap in time and frequency domain with the prohibited resources indicated by the ULPI. In a second example of the fourth embodiment, the UE can start its UL URLLC transmission from a first available UL symbol outside the duration x-y. In a third example of the fourth embodiment, the UE can start its UL URLLC transmission from a first available UL symbol outside the duration x-y if such is indicated, such as via higher layer signaling, such as RRC configuration/MAC CE, or via physical layer signaling such as DCI, such as indicated by the ULPI or in the DCI corresponding to the UL URLLC, including PUSCH DCI or URLLC-PDSCH DCI.

In a fifth embodiment, the UE may not be expected to receive a DCI, including PUSCH DCI or URLLC-PDSCH DCI, to perform UL URLLC transmission during x-y.

In a sixth embodiment, the UE can start its UL URLLC transmission from symbol 'z' or another symbol within x-y as described above, and overlapped eMBB frequency resources can be punctured for the UE's own UL URLLC transmission. In an alternative sixth embodiment, the UE can start its UL URLLC transmission from symbol 'z' or another symbol within x-y as described above, and overlapped eMBB frequency resources can be rate-matched around for the UE's own UL URLLC transmission. In an another alternative sixth embodiment, the UE can determine whether to puncture or rate-match around overlapped eMBB frequency resources, such as via a higher layer/physical layer indication and/or based on the URLLC and/or eMBB transmission parameters, such as number of RBs, code rate, TB size, transmission power, transmission duration, number of CBGs, whether the transmission is on dynamically granted resources or configured resources, and/or based on other information.

In a related embodiment to the sixth embodiment, rate-matching can be applicable only when OFDM-based waveform, as opposed to Discrete Fourier Transform (DFT) precoded-based waveform, is used for UL operation. In another related embodiment to the sixth embodiment, rate-matching can be applicable if the pre-empted resources used for rate-matching are located at the edge of the URLLC allocation, such as in a case of configured grant based URLLC allocation. In another related embodiment to the sixth embodiment, the pre-empted resources may not divide the remaining eMBB allocation, after pre-empting the pre-empted resources, into, for example, non-contiguous portions or into more than, for example, one non-contiguous portion.

In a seventh embodiment, if the UE receives an ULPI to cancel a dynamically scheduled or configured grant first PUSCH or PUCCH transmission from symbol 'z', then the UE can transmit a second PUSCH or PUCCH, where the first symbol of the second PUSCH or PUCCH can start at or after symbol z and the time-frequency resource of the second PUSCH or PUCCH does not overlap with the time-frequency resource corresponding to the cancelled first PUSCH or PUCCH transmission. In another embodiment, the ULPI can indicate at least one time-frequency resource where the UE should not transmit. If the UE cancels the first PUSCH/PUCCH transmission according to the received ULPI, the UE can transmit the second PUSCH/PUCCH, where the second PUSCH/PUCCH can start after the cancellation of the first PUSCH/PUCCH and the time-frequency resource of the second PUSCH/PUCCH may not overlap with the at least one time-frequency resource indicated by the received ULPI. For the dynamically scheduled second PUSCH/PUCCH transmission, the UE can transmit the second PUSCH/PUCCH if the UE has enough processing time to cancel the first PUSCH/PUCCH upon receiving the ULPI, such as if the timeline requirement between ULPI reception and cancellation of the first PUSCH/PUCCH is met and the PUSCH/PUCCH preparation time for the second PUSCH/PUCCH transmission is met.

In one example, the UE can be scheduled to transmit eMBB PUSCH transmission and can receive an indication from higher layers that an URLLC packet is in its buffer. The UE can transmit the URLLC packet on the eMBB PUSCH resources in place of the eMBB packet, or can stop the on-going eMBB PUSCH transmission, such as on a symbol boundary, and the UE can start transmission of the URLLC packet from the next or a future symbol. The UE can indicate this change from eMBB to URLLC via using a different DMRS signal, such as a DMRS with a different scrambling sequence or a different OCC code, or via including a data-associated UCI within the PUSCH transmission. In one example, the MCS or Transport Block Size (TBS) of the URLLC packet can be a function of the eMBB TBS or MCS, the Redundancy Version (RV) may be fixed to a particular version, such as RV 0, and/or the Hybrid Automatic Repeat Request Identifier (HARQ ID) of URLLC may be the same as that of eMBB if eMBB packet is a new transmission, such as if a New Data Indicator (NDI) is toggled, and/or may correspond to a pre-determined configured autonomous URLCC HARQ-ID. In one example, the MCS or TBS, and/or RV, and/or HARQ-ID can be indicated as part of the data-associated UCI. In one example, if the UE is configured with a configured grant that overlaps in time with the eMBB PUSCH transmission, the UE can transmit the URLLC packet on the configured grant. In one example, the UE can transmit the eMBB transmission together with the URLLC transmission. In another example, the UE may interrupt and resume or drop the remaining eMBB transmission.

Many of the embodiments and examples above can be applicable to the case that the URLLC traffic of the pre-empted UE is to be transmitted in configured grant resources.

At least some embodiments below can provide methods for SRS operation when a UE receives an ULPI. At least some embodiments can also provide for determining number of SRS symbols when ULPI is received.

Figure 2:
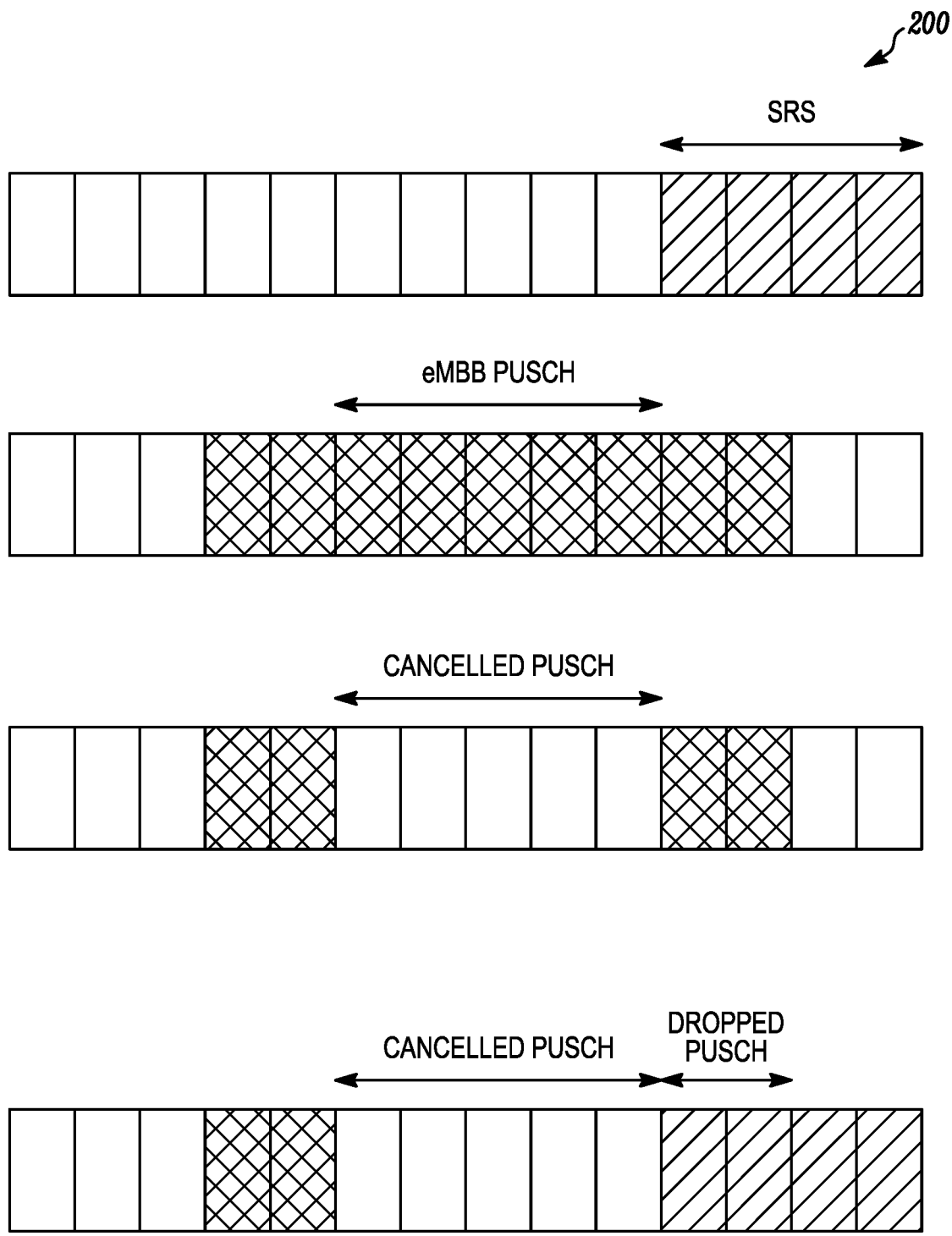
FIG. 2 is an example illustration of dropping at least part of a Physical Uplink Shared Channel (PUSCH) transmission after Uplink Pre-Emption Indication (ULPI) cancellation according to a possible embodiment.

FIG. 2 is an example illustration 200 of dropping at least part of a PUSCH transmission after cancellation due to ULPI when the remainder of the PUSCH overlaps with SRS according to a possible embodiment. When ULPI cancels a PUSCH partially, the remainder of the PUSCH after cancellation can be determined to be resumed or to be dropped. In an example, the UE can determine whether/how to resume PUSCH based on the ULPI, and number of SRS symbols in that slot. Since on a serving cell/Component Carrier (CC), SRS and PUSCH are Time Division Multiplexed (TDMed) as discussed below, the remainder of PUSCH after cancellation can be resumed if the number of SRS symbols overlapping with the remainder of the PUSCH is smaller than a threshold and can be dropped otherwise. The threshold can be indicated by physical or higher layer signaling.

In another example, the UE can determine whether/how to resume PUSCH based on a fraction of remaining PUSCH symbols/resources relative to the allocated PUSCH symbols/resources in the corresponding UL grant. For example, if the fraction is larger than a threshold, such as ¼, then the UE can resume the PUSCH. Otherwise, the UE can drop the PUSCH. The threshold can be indicated by physical/higher layer signaling.

In a related example, the DCI scheduling the eMBB PUSCH can be CRC-scrambled by an MCS-RNTI. In another related example, the UE may not be expected to receive a grant for eMBB PUSCH transmission overlapping in the time-domain with a configured SRS transmission. However, the UE can receive a grant enabling URLLC UL transmission overlapping SRS in the time domain. In such a case, the overlapping SRS symbols can be dropped. The UE can distinguish the eMBB vs. URLLC grant via RNTI, such as MCS-RNTI vs. C-RNTI, via DCI format/size, via monitoring occasion, via traffic class indication, and via other methods.

Figure 3:
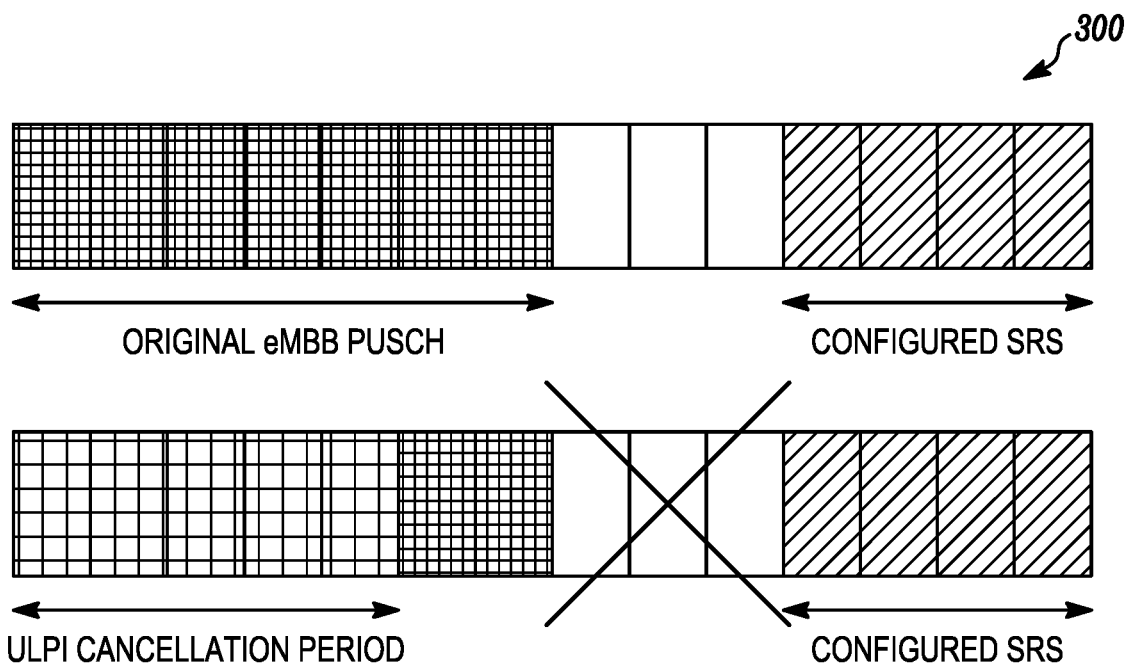
FIG. 3 is an example illustration of a case when PUSCH may not be resumed if a part to be resumed overlaps with configured Sounding Reference Signal (SRS) transmission according to a possible embodiment.
Figure 4:
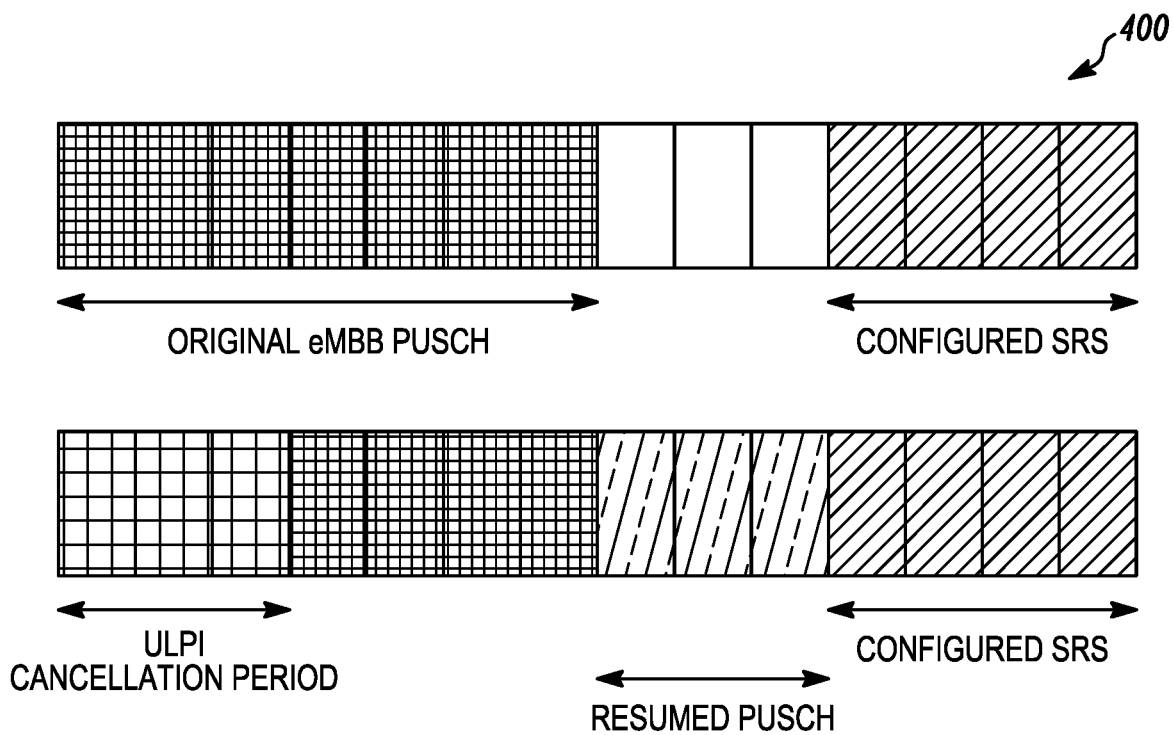
FIG. 4 is an example illustration of a case when PUSCH can be resumed if a part to be resumed does not overlap with configured SRS transmission according to a possible embodiment.

FIG. 3 is an example illustration 300 of a case when PUSCH may not be resumed if a part of the PUSCH to be resumed overlaps with a configured SRS transmission according to a possible embodiment. FIG. 4 is an example illustration 400 of a case when PUSCH can be resumed if the to be resumed part does not overlap with configured SRS transmission according to a possible embodiment. For example, if an eMBB PUSCH was partially cancelled by an ULPI, the PUSCH can be resumed after muting the ULPI indicated symbols if the resumed PUSCH does not overlap with a configured SRS transmission.

Figure 5:
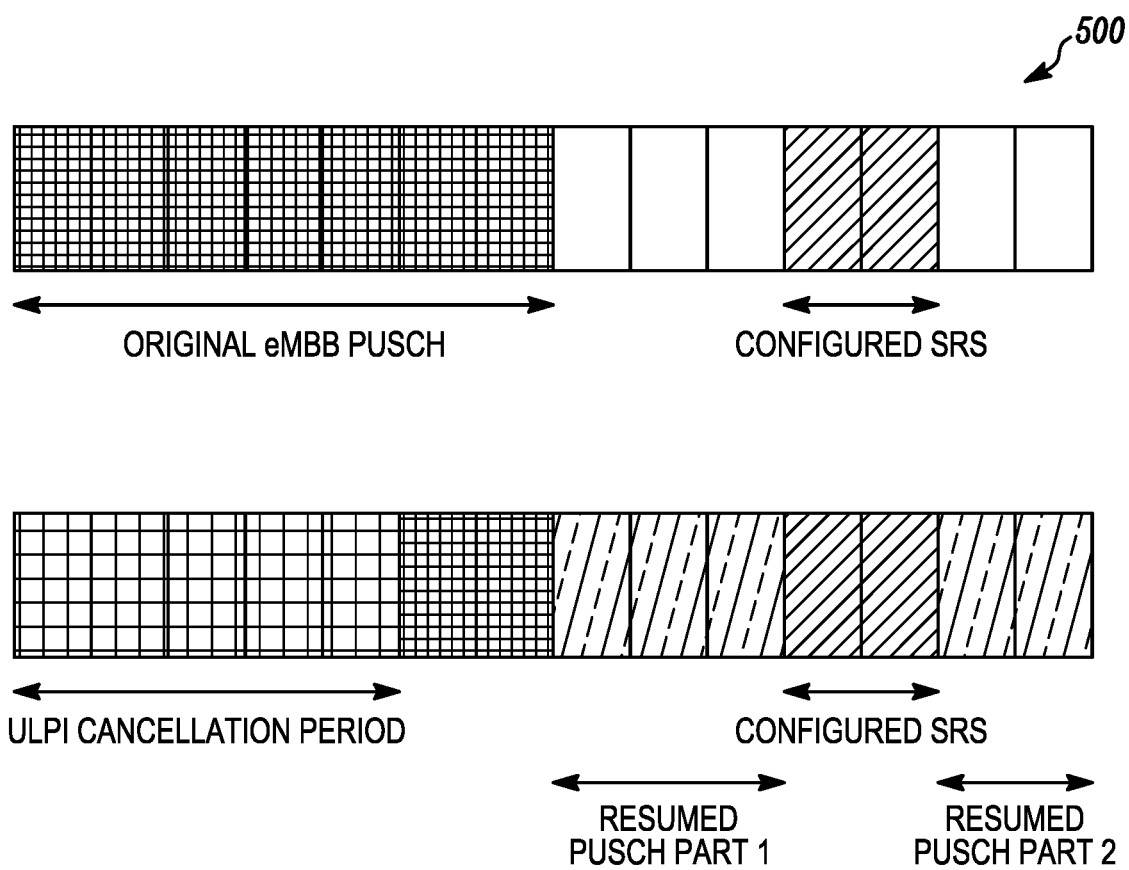
FIG. 5 is an example illustration of case of part of PUSCH to be resumed overlaps with a configured SRS according to a possible embodiment.

FIG. 5 is an example illustration 500 of a related example case where if the part of PUSCH to be resumed overlaps with a configured SRS, the UE can resume the PUSCH after the SRS symbols, such as if number of SRS symbols is below a certain number, according to a possible embodiment. The certain number of SRS symbols can be specified or indicated.

In a related example, the UE can receive an ULPI indicating that the configured SRS transmission should be cancelled. In a related embodiment, if ULPI was sent quite late, such as after a certain time with respect to SRS symbols or compared to SRS preparation time, the UE can drop the SRS symbols overlapping with the original scheduled/not cancelled eMBB PUSCH/DMRS. The certain time can be a UE capability.

In a related embodiment, if ULPI was sent early enough, such as before a certain time with respect to SRS symbols, the UE can transmit the SRS symbols overlapping with the original scheduled/not cancelled eMBB PUSCH/DMRS but not overlapping with the partially cancelled eMBB PUSCH/DMRS. Again, the certain time can be a UE capability.

Figure 6:
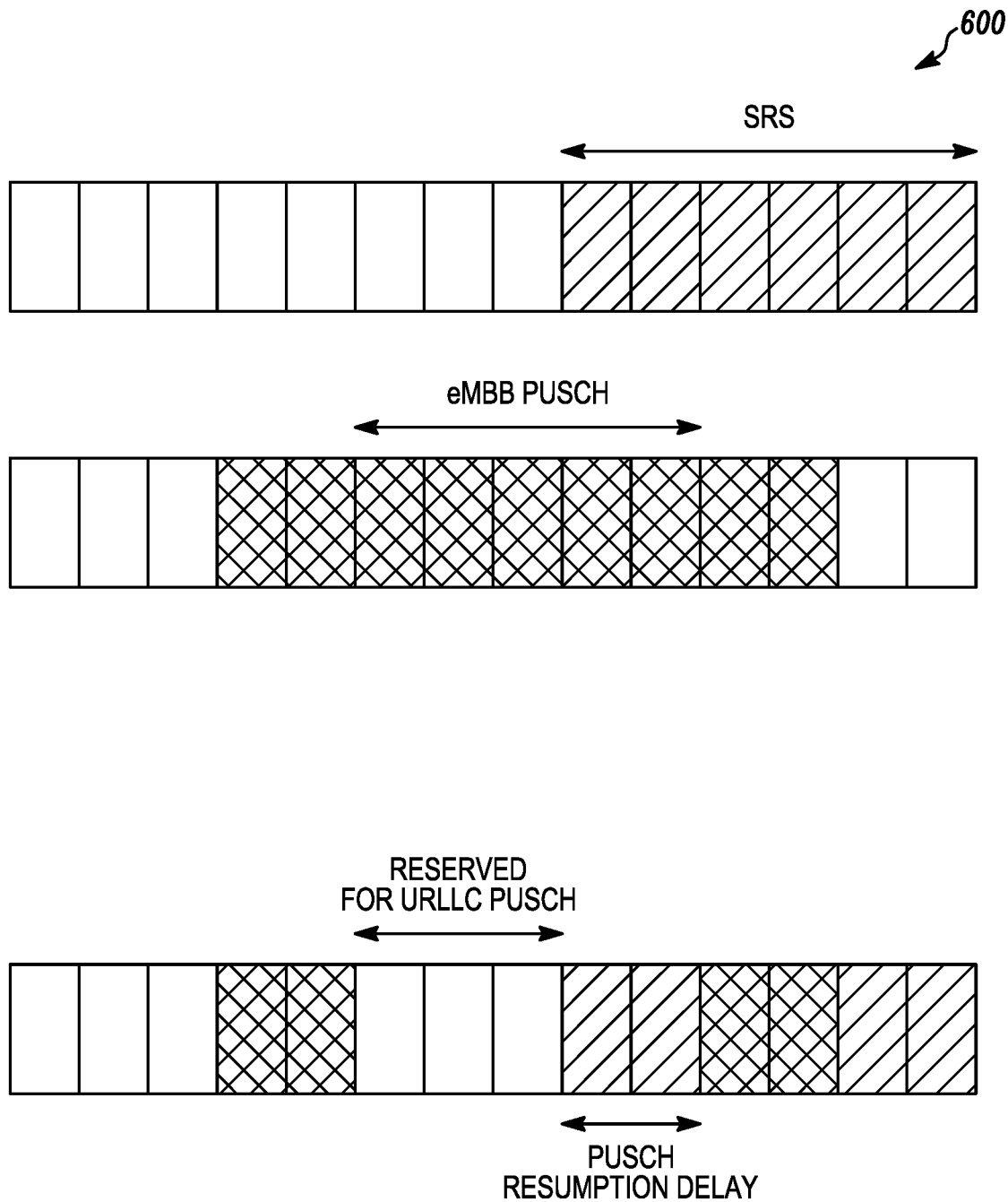
FIG. 6 is an example illustration of transmission of SRS and partially cancelled eMBB PUSCH according to a possible embodiment.

FIG. 6 is an example illustration 600 of transmission of SRS and partially cancelled eMBB PUSCH according to a possible embodiment. A UE can be scheduled to transmit an eMBB PUSCH along with its DMRS for a first set of symbols in a slot. The UE can have SRS to be transmitted in a second set of symbols in the slot. The UE can receive an ULPI to cancel the eMBB PUSCH/DMRS for a third set of symbols in the slot where the third set of symbols can be a subset of the first set of symbols. The UE can cancel its eMBB PUSCH/DMRS for the third set of symbols. The UE can determine a fourth set of symbols based on the first, second, and third sets. The fourth set can be a subset of the second set. The fourth set and the third set of symbols may not overlap. The UE can cancel eMBB PUSCH/DMRS for the fourth set of symbols. The UE can transmit SRS in the fourth set of symbols.

In a second embodiment based on the preceding possible embodiment, the fourth set for transmitting the SRS can include at least two non-adjacent symbols that, for example, can occur in a case where eMBB PUSCH resumption delay, such as a delay of resuming PUSCH after cancelling a part of PUSCH shown in the illustration 600, leads to a symbol different than that of the start of SRS. As shown, the SRS can be transmitted during the eMBB PUSCH resumption delay and the later transmitted SRS can be non-adjacent to the SRS transmitted during the eMBB PUSCH resumption delay.

From TS 38.214, when PUSCH and SRS are transmitted in the same slot, the UE can only be configured to transmit SRS after the transmission of the PUSCH and the corresponding DM-RS. From a related agreement, TDM may only be supported between SRS and PUSCH/UL DMRS/UL Phase-Tracking Reference Signals (PTRSs)/Long PUCCH in Rel-15 from UE perspective.

At least some embodiments can provide for ULPI and SRS switching. From TS 38.331, srs-SwitchFromServCellIndex can indicate the serving cell whose UL transmission may be interrupted during SRS transmission on a PUSCH-less cell. During SRS transmission on a PUSCH-less cell, the UE may temporarily suspend the UL transmission on a serving cell with PUSCH in the same Cell Group (CG) to allow the PUSCH-less cell to transmit SRS.

In an example embodiment, an ULPI can be sent on a first serving cell/Component Carrier (CC) to suspend SRS transmission on a second cell, such as a PUSCH-less cell, such as a cell not configured for PUSCH/PUCCH transmission. The ULPI can indicate the PUSCH-less cell index. Then, the UE, upon decoding the ULPI, can cancel/pre-empt the SRS transmission on the PUSCH-less cell. In one example, the cell index can be a logical cell index, such as a serving cell index. In another example the cell index can be a Physical Cell ID (PCID) or a portion of, or based on, the PCID. For instance, if a group common PDCCH is used for ULPI, for cancelling/pre-empting an SRS transmission on a cell, such as in a case of SRS switching, a function of PCID of the cell or a logical cell index of the cell can be indicated in the group common indication. For instance, the indicated cell index in the ULPI can be applicable to the group of UEs sharing the same cell ID, such as the same PCID, for SRS switching. SRS switching can include switching CCs for transmitting SRSs.

In another embodiment, there can be a field, similar to an SRS request filed, in the ULPI DCI indicating whether the cancelled transmission is an SRS transmission if there is a possibility of another UL transmission, such as PUCCH transmission in the cell/carrier which ULPI indicates pre-emption for. For example, if there is a possibility of another UL transmission, then the field can indicate whether the cancelled transmission is an SRS transmission. This embodiment could be applicable to SRS switching scenario and also to no-switching scenario. In a related example, the SRS request field in ULPI can be interpreted as indication of cancelling SRS transmission on SRS resources associated with the SRS request.

In an example, a higher layer parameter, such as srs-SwitchFromServCellIndex, can indicate the index of a first serving cell whose UL transmission can be interrupted during SRS transmission on a second serving cell, such as a PUSCH-less cell. During SRS transmission on the PUSCH-less cell, the UE can temporarily suspend the UL transmission on the first serving cell for a first set of symbols to allow the PUSCH-less cell to transmit SRS. If the UE receives an ULPI to suspend SRS transmission on the PUSCH-less cell, such as a cell not configured for PUSCH/PUCCH transmission, depending on the processing timeline of the ULPI, the UE can change or revert its decision of suspension of a subset of the first set of symbols on the first serving cell, and continue transmission of PUSCH symbols on the first serving cell.

In another example, an ULPI can be sent on a first serving cell/CC to suspend eMBB PUSCH transmission on a second serving cell for a first set of symbols. A higher layer parameter, such as srs-SwitchFromServCellIndex, can indicate the index of the second serving cell whose UL transmission may be interrupted during SRS transmission on a third serving cell, such as a PUSCH-less cell. During SRS transmission on the PUSCH-less cell, the UE can temporarily suspend the UL transmission on the second serving cell for a second set of symbols to allow the PUSCH-less cell to transmit SRS.

Figure 7:
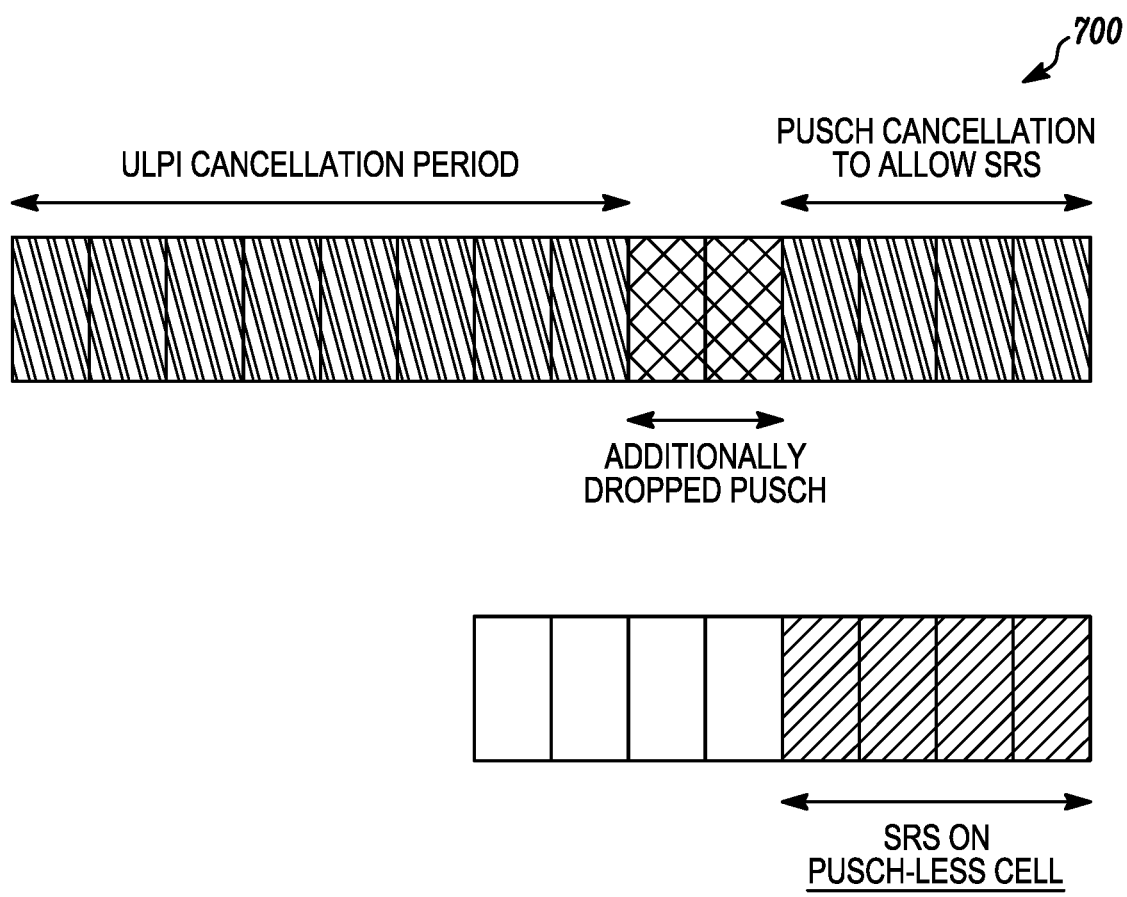
FIG. 7 is an example illustration of dropping a third set of PUSCH symbols according to a possible embodiment.

FIG. 7 is an example illustration 700 of dropping a third set of PUSCH symbols according to a possible embodiment. In this example related to the above example, the UE can additionally skip/suspend/drop a third set of symbols of the eMBB PUSCH symbols, where the third set of symbols can be disjoint with the first and second set of symbols. Dropping the third set of symbols can be useful for instance, in a scenario that already most of the eMBB PUSCH symbols have been dropped due to URLLC traffic of other UEs as well as SRS transmission of the UE on the PUSCH-less cell.

In another example, the UE may not be expected to monitor ULPI for a first serving cell with a first serving cell index and the UE can be configured with a higher layer parameter, such as srs-SwitchFromServCellIndex, indicating the first serving cell index whose UL transmission may be interrupted during SRS transmission on a PUSCH-less cell. Such a condition may simplify eMBB PUSCH handling at the UE side in terms of PUSCH cancellation and resumption.

In a possible embodiment, a PUSCH on cell 1 can be interrupted to allow SRS transmission on a PUSCH-less cell. An ULPI can be sent to cancel SRS on the PUSCH-less cell. If ULPI sent early enough, PUSCH can be resumed and/or not dropped since there is no overlap with SRS transmissions, as the SRS transmissions are canceled due to the ULPI. Otherwise, the PUSCH can be dropped and the SRS can be dropped. Alternatively, the behavior can be left up to UE implementation, such as by the UE dropping the PUSCH.

In another example with URLLC on CC1, SRS on PUSCH-less cell CC2, the UE can determine and/or can be indicated, such as via DCI/RRC/MAC CE, whether to temporarily suspend the UL transmission on the first serving cell (CC1) for a first set of symbols to allow SRS transmission on the second serving cell (CC2), such as on the PUSCH-less cell. The DCI can have the same format as ULPI. In an example, ULPI can be used to at least partially cancel SRS transmission on the PUSCH-less cell.

In a related example, for URLLC traffic on the first serving cell, the UE may not temporarily suspend the UL transmission on the first serving cell to allow SRS transmission on the second serving cell. In other words, the UE may not transmit SRS symbols on the second serving cell overlapping in the time domain with the URLLC traffic on the first serving cell. In a related example, the SRS can be suspended based on a priority indicated in the URLLC DCI or based on an RNTI, such as MCS-RNTI, used to scramble the CRC of the URLLC DCI.

At least some embodiments can address when a UE receives an ULPI for its eMBB UL transmission, what the UE behavior/operation will be if a URLLC UL traffic for the UE arrives. Different techniques can determine the start of the UL URLLC traffic transmission of the UE. At least some embodiments can also address when a UE receives an ULPI for its eMBB UL transmission, what the impact will be on the UE's SRS transmission. At least some embodiments can provide for determining whether/how to resume PUSCH based on the ULPI, number of SRS symbols in the slot, and SRS switching and at least some embodiments can provide for determining a number of transmitted SRS symbols when ULPI is used to cancel an overlapping PUSCH on the same carrier or in case of carrier switching.

Figure 8:
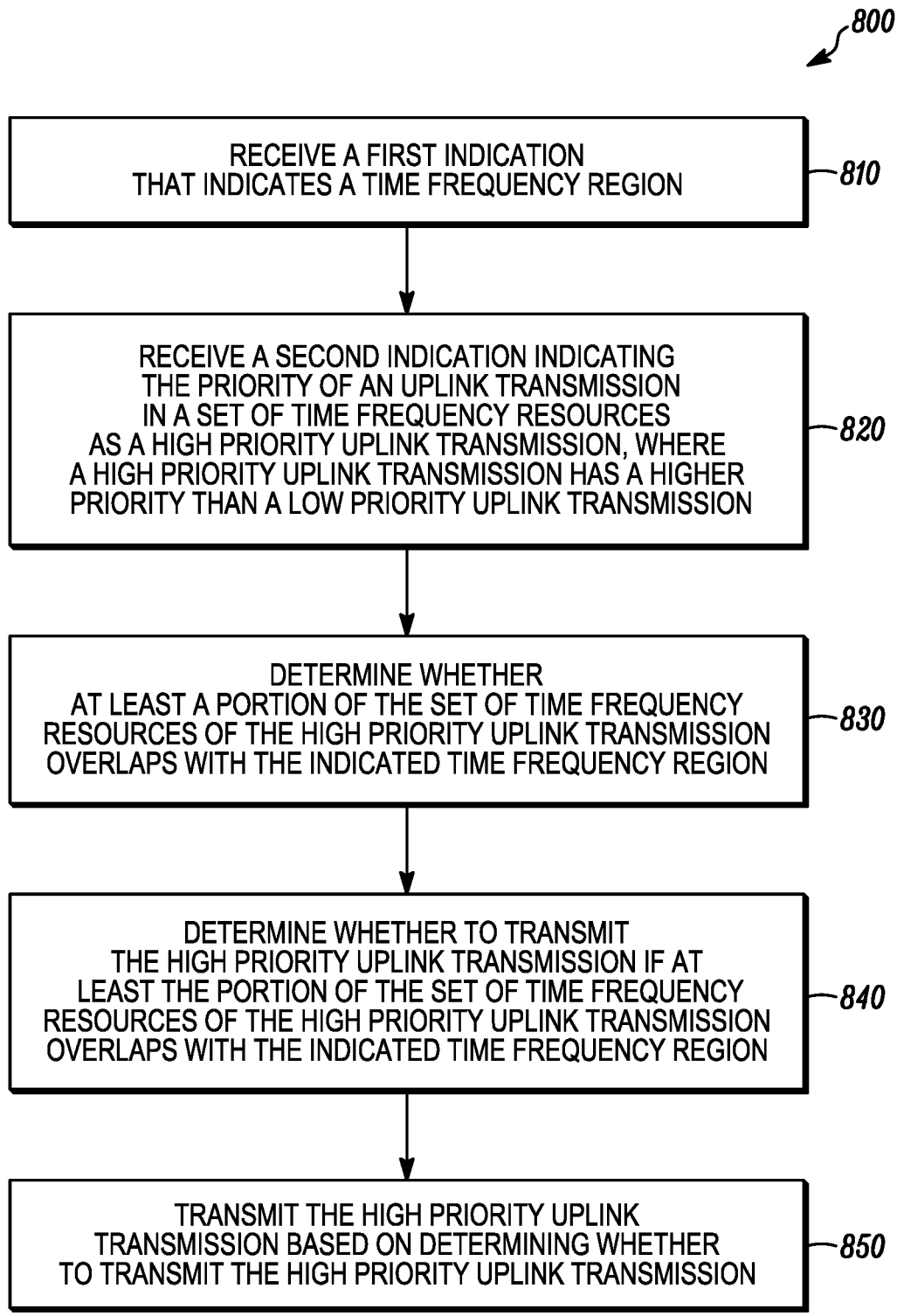
FIG. 8 is an example flowchart illustrating the operation of an apparatus according to a possible embodiment.

FIG. 8 is an example flowchart 800 illustrating the operation of a wireless communication device, such as the UE 110, according to a possible embodiment. At 810, a first indication that indicates a time frequency region can be received. The first indication can be an ULCI, which can also be referred to as an ULPI. The time frequency region can be a duration x-y from a first symbol 'x' to a second symbol 'y'. The first indication can indicate to cancel an UL transmission in the duration. The first indication can be sent in a group common PDCCH. The first indication may not initiate an UL transmission by the UE.

At 820, a second indication can be received. The second indication can indicate the priority of an UL transmission in a set of time frequency resources as a high priority UL transmission. The high priority UL transmission can have a higher priority than a low priority UL transmission. For example, the second indication can indicate the UL transmission as an URLLC transmission or other transmission that has higher priority than another transmission. The low priority UL transmission can be an eMBB transmission or other transmission that has lower priority than another transmission. The second indication can be received in an UL grant scheduling the UL transmission, such as a grant received in DCI, can be received via higher layers, such as via RRC, and/or can be otherwise received. The second indication can be received before or after the first indication. For example, the second indication can be a configured grant indication, such as a configured grant RRC indication, can be a DCI indication, or can be another indication.

At 830, a determination can be made as to whether at least a portion of the set of time frequency resources of the high priority UL transmission overlaps with the indicated time frequency region. According to a possible embodiment, the determination can be made as to whether at least the portion of the set of time frequency resources of the high priority UL transmission overlaps with the indicated time frequency region at least in time. The time frequency region can belong to a first serving cell. The at least the portion of set of time frequency resources of the high priority UL transmission can belong to a second serving cell.

At 840, a determination can be made as to whether to transmit the high priority UL transmission if at least the portion of the set of time frequency resources of the high priority UL transmission overlaps with the indicated time frequency region. According to a possible embodiment, the determination can be made to transmit the high priority UL transmission if the set of time frequency resources occurs after the time required for processing the first indication. According to another possible embodiment, determining whether to transmit the high priority UL transmission can include determining to transmit the high priority UL transmission if the second indication is received after the first indication.

According to another possible embodiment, the first indication can be an ULCI that preempts UL transmission in the time frequency region. Then, determining whether to transmit the high priority UL transmission can include determining to override the first indication and transmit the high priority UL transmission.

According to another possible embodiment, the high priority UL transmission can include multiple repetitions of a first UL transmission. At least the portion of set of time frequency resources can include time-frequency resources of at least one repetition of the first UL transmission that overlaps with the indicated time frequency region. Then, the determination at 840 can include determining to transmit the repetitions other than the at least one repetition of the first UL transmission.

According to a possible embodiment, a third indication can be received via higher layer signaling. The higher layer signaling can be higher than physical layer signaling. The third indication can indicate whether transmitting the high priority UL transmission in at least the portion of the set of time frequency resources that overlaps the indicated time frequency region is allowed. The third indication can indicate whether the UE is allowed to transmit, such as by enabling transmission of, a high priority UL transmission in a time frequency region, such as symbols, that have been canceled/dropped in response to receiving a ULCI that indicates to cancel/drop a lower priority transmission, such as an eMBB transmission, in the time frequency region. Then, determining whether to transmit the high priority UL transmission can include determining to transmit the high priority UL transmission at least based on the third indication indicating transmitting the high priority UL transmission in at least the portion of the set of time frequency resources is allowed.

At 850, the high priority UL transmission can be transmitted based on determining whether to transmit the high priority UL transmission. Transmitting the high priority UL transmission can include rate matching the high priority UL transmission around at least the portion of the set of time frequency resources that overlap the indicated time frequency region. Additionally, or alternately, transmitting the high priority UL transmission can include puncturing of the high priority UL transmission in at least the portion of the set of time frequency resources that overlap the indicated time frequency region.

According to a possible embodiment, a determination can be made as to whether to rate match the high priority UL transmission around at least the portion of the set of time frequency resources that overlap the indicated time frequency region based on a number of RBs of the time frequency region and a number of RBs of the set of time frequency resources. In response to determining to rate match the high priority UL transmission, the high priority UL transmission can be transmitted rate matched around at least the portion of the set of time frequency resources that overlap the indicated time frequency region.

According to a possible embodiment, a low priority UL transmission can be cancelled if the low priority UL transmission overlaps the indicated time frequency region. According to a possible implementation, the low priority UL transmission can overlap with an SRS transmission in a second set of time frequency resources. The second set of time frequency resources may not overlap with the time frequency region. Then, SRS can be transmitted in the second set of time frequency resources if the first indication is sent at least a certain number of symbols prior to the SRS transmission.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, embodiments can provide for reciprocal operation of a network entity, where the network entity performs reciprocal operations of the UE operations.

Figure 9:
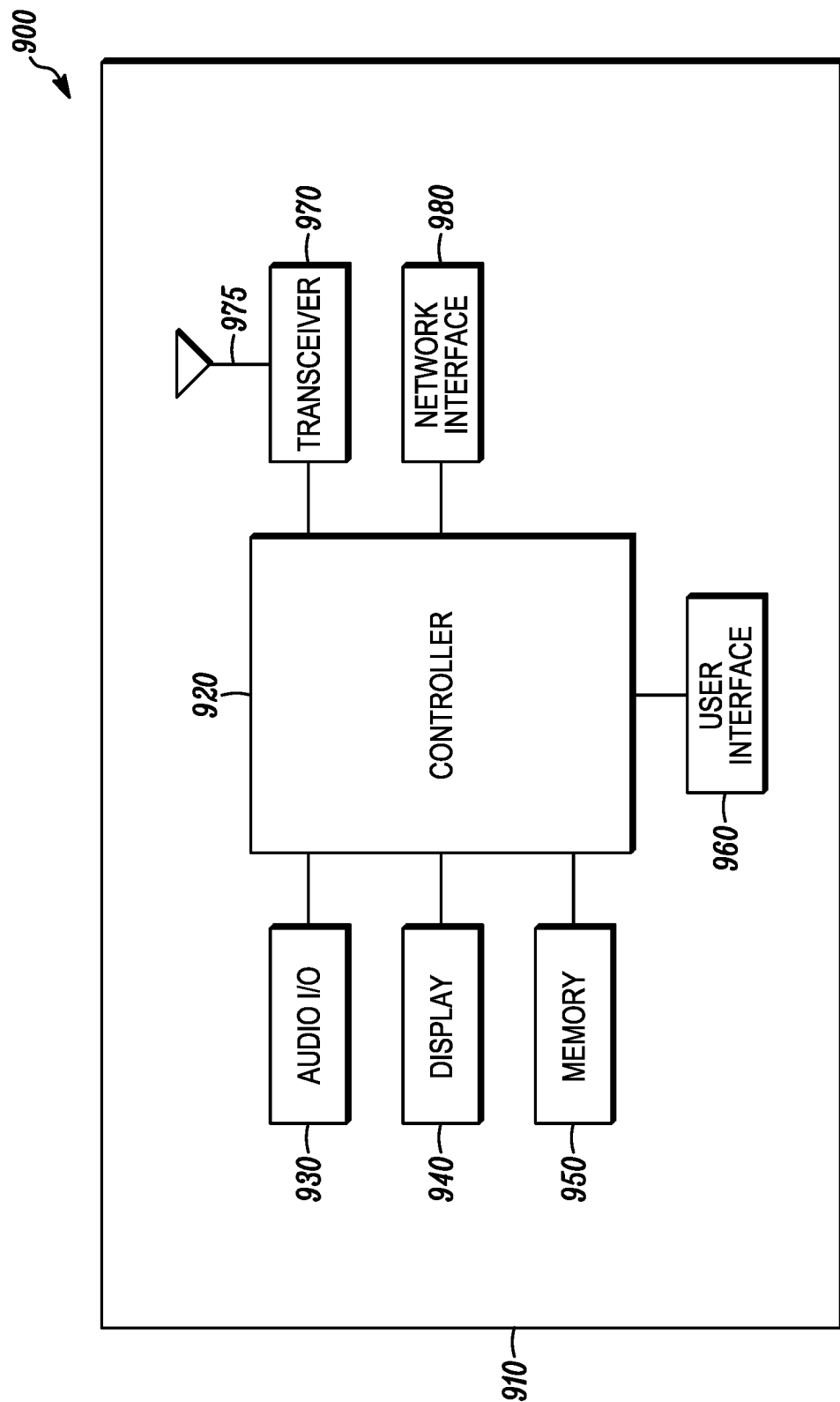
FIG. 9 is an example block diagram of an apparatus according to a possible embodiment.

FIG. 9 is an example block diagram of an apparatus 900, such as the UE 110, the network entity 120, or any other wireless communication device disclosed herein, according to a possible embodiment. The apparatus 900 can include a housing 910, a controller 920 coupled to the housing 910, audio input and output circuitry 930 coupled to the controller 920, a display 940 coupled to the controller 920, a memory 950 coupled to the controller 920, a user interface 960 coupled to the controller 920, a transceiver 970 coupled to the controller 920, at least one antenna 975 coupled to the transceiver 970, and a network interface 980 coupled to the controller 920. The apparatus 900 may not necessarily include all of the illustrated elements for different embodiments of the present disclosure. The apparatus 900 can perform the methods described in all the embodiments.

The display 940 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 970 can be one or more transceivers that can include a transmitter and/or a receiver. The audio input and output circuitry 930 can include a microphone, a speaker, a transducer, or any other audio input and output circuitry. The user interface 960 can include a keypad, a keyboard, buttons, a touch pad, a joystick, a touch screen display, another additional display, or any other device useful for providing an interface between a user and an electronic device. The network interface 980 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 950 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 900 or the controller 920 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 950, elsewhere on the apparatus 900, in cloud storage, and/or anywhere else that can store software and/or an operating system. The apparatus 900 or the controller 920 may also use hardware to implement disclosed operations. For example, the controller 920 may be any programmable processor. Furthermore, the controller 920 may perform some or all of the disclosed operations. For example, at least some operations can be performed using cloud computing and the controller 920 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 920 may be any controller or processor device or devices capable of operating an apparatus and implementing the disclosed embodiments. Some or all of the additional elements of the apparatus 900 can also perform some or all of the operations of the disclosed embodiments.

In operation, the apparatus 900 can perform the methods and operations of the disclosed embodiments. The transceiver 970 can transmit and receive signals, including data signals and control signals that can include respective data and control information. The controller 920 can generate and process the transmitted and received signals and information.

According to a possible embodiment, the transceiver 970 can receive a first indication that indicates a time frequency region. According to a possible embodiment, the first indication may not initiate an UL transmission by the apparatus 900. According to another possible embodiment, the first indication can be an ULCI that preempts UL transmission in the time frequency region. The transceiver 970 can receive a second indication indicating the priority of an UL transmission in a set of time frequency resources as a high priority UL transmission. The high priority UL transmission can have a higher priority than a low priority UL transmission.

The controller 920 can determine whether at least a portion of the set of time frequency resources of the high priority UL transmission overlaps with the indicated time frequency region. According to a possible embodiment, the controller 920 can cancel a low priority UL transmission if the low priority UL transmission overlaps the indicated time frequency region.

The controller 920 can determine whether to transmit the high priority UL transmission if at least the portion of the set of time frequency resources of the high priority UL transmission overlaps with the indicated time frequency region. According to a possible embodiment, the controller 920 can determine whether to transmit the high priority UL transmission by determining to override the first indication and transmit the high priority UL transmission. According to another possible embodiment, the controller 920 can determine whether to transmit the high priority UL transmission by determining to transmit the high priority UL transmission if the set of time frequency resources occurs after the time required for processing the first indication. The transceiver 970 can transmit the high priority UL transmission based on determining whether to transmit the high priority UL transmission.

At least some embodiments can provide a method at a device. The method can include receiving an ULPI indication to cancel a scheduled first PUSCH transmission. The first PUSCH transmission can occupy a duration x-y composed of PUSCH transmission from symbol 'x' to symbol 'y'. The method can include preparing a second PUSCH transmission associated with a lower communication latency or higher communication reliability compared to the first PUSCH to be transmitted starting symbol 'z', where 'z' can belong to the duration x-y. The method can include starting transmission of the second PUSCH from symbol 'z' if the DCI associated with the second PUSCH has been received after the ULPI. The second PUSCH transmission can start from symbol 'z' if the UE is indicated via ULPI, and if the DCI associated with the second PUSCH has been received before the ULPI. The second PUSCH transmission can start from symbol 'z+d' if the UE is indicated 'd' via ULPI if the DCI associated with the second PUSCH has been received before the ULPI, where 'd'>0. The UE can start its second PUSCH transmission from symbol 'z+k'(k>=0), and overlapped frequency resources of the first and second PUSCH can be punctured for the second PUSCH transmission. The UE can start its second PUSCH transmission from symbol 'z+k'(k>=0), and overlapped frequency resources of the first and second PUSCH can be rate-matched for the second PUSCH transmission.

At least some embodiments can provide a method at a device that can be scheduled to transmit an PUSCH along with its DMRS for a first set of symbols in a slot. The device can have SRS to be transmitted in a second set of symbols in the slot. The device can receive an UL cancellation indication, such as ULPI, to cancel the PUSCH/DMRS for a third set of symbols in the slot. The third set of symbols can be a subset of the first set of symbols. The device can determine a fourth set of symbols based on the first, second, and third sets. The fourth set can be a subset of the second set. The fourth set and the third set of symbols may not overlap. The device can cancel PUSCH/DMRS for the third and fourth set of symbols. The device can transmit SRS in the fourth set of symbols. The fourth set can be composed of at least two non-adjacent symbols.

At least some embodiments can provide a method at a device that can have a PUSCH along with its DMRS for a first set of symbols in a slot. The device can have SRS to be transmitted in a second set of symbols in the slot. The first and the second set of symbols can overlap in a third set of symbols. The device can receive a DCI. The device can determine, based on the DCI, which one of the PUSCH/DMRS or SRS should be dropped for the third set of symbols. The device can transmit SRS in the third set of symbols if PUSCH/DMRS is determined to be dropped for the third set of symbols and can transmit PUSCH/DMRS otherwise.

At least some embodiments can provide a method at a device that can have a PUSCH along with its DMRS for a first set of symbols in a slot. The device can have SRS to be transmitted in a second set of symbols in the slot, where the first and the second set of symbols can overlap in a third set of symbols. The device can receive a DCI. The device can determine based on the DCI, a fourth set of symbols. The device can transmit SRS in the fourth set of symbols, where the fourth set can be a subset of the second and third sets of symbols. The device can transmit SRS in the second set of symbols excluding the third set of symbols. The device can transmit PUSCH/DMRS in the first set of symbols excluding the fourth set of symbols.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus comprising:
   a transceiver configured to receive an Uplink Cancellation Indication (ULCI) Downlink Control Information (DCI) with a group-common DCI format for a serving cell, where the ULCI DCI indicates a group of symbols and a group of Physical Resource Blocks (PRBs);
   a controller coupled to the transceiver, the controller configured to cancel, in response to receiving the DCI, a Physical Uplink Shared Channel (PUSCH) transmission or a Sounding Reference Signal (SRS) transmission on the serving cell
      if the PUSCH transmission is with low priority based on the apparatus being provided a Radio Resource Control (RRC) indication indicating ULCI is only applicable to Uplink (UL) transmissions with low priority level, and
      if the group of symbols includes a symbol of the PUSCH or of the SRS transmission, and
      if the group of PRBs includes a PRB of the PUSCH or of the SRS transmission.

2. The apparatus according to claim 1, wherein the PUSCH transmission is cancelled if the PUSCH transmission is scheduled by a DCI that is received before the ULCI.

3. The apparatus according to claim 1, wherein the PUSCH transmission is not cancelled earlier than a certain time after the ULCI.

4. The apparatus according to claim 1, wherein the cancellation of the PUSCH transmission includes cancellation of symbols of the PUSCH transmission after the group of symbols.

5. The apparatus according to claim 1, wherein the PUSCH transmission is a configured grant PUSCH transmission.

6. The apparatus according to claim 5, wherein the transceiver performs an autonomous retransmission in response to cancelling the PUSCH transmission.

7. The apparatus according to claim 1, wherein the PUSCH transmission has high priority if the apparatus is not provided the RRC indication.

8. The apparatus according to claim 1,
   wherein the PUSCH transmission overlaps with an SRS transmission in a set of time frequency resources,
   wherein the set of time frequency resources does not include any symbol of the group of symbols and any PRB of the group of PRBs, and
   wherein the transceiver transmits an SRS in the set of time frequency resources if the ULCI is sent at least a certain number of symbols prior to the SRS transmission.

9. The apparatus according to claim 1, wherein the transceiver transmits a high priority PUSCH transmission, where transmitting the high priority transmission includes at least one selected from
   rate matching the high priority PUSCH transmission around at least a portion of time frequency resources of the PUSCH transmission that overlaps the indicated group of symbols and the indicated group of PRBs, and
   puncturing of the high priority uplink transmission in at least the portion of time frequency resources of the PUSCH transmission that overlaps the indicated group of symbols and the indicated group of PRBs.

10. A method at a device, the method comprising:
   receiving an Uplink Cancellation Indication (ULCI) Downlink Control Information (DCI) with a group-common DCI format for a serving cell, where the ULCI DCI indicates a group of symbols and a group of Physical Resource Blocks (PRBs);
   canceling, in response to receiving the DCI, a Physical Uplink Shared Channel (PUSCH) transmission or a Sounding Reference Signal (SRS) transmission on the serving cell
      if the PUSCH transmission is with low priority based on the device being provided a Radio Resource Control (RRC) indication indicating ULCI is only applicable to Uplink (UL) transmissions with low priority level, and
      if the group of symbols includes a symbol of the PUSCH or of the SRS transmission, and
      if the group of PRBs includes a PRB of the PUSCH or of the SRS transmission.

11. The method according to claim 10, wherein the PUSCH transmission is cancelled if the PUSCH transmission is scheduled by a DCI that is received before the ULCI.

12. The method according to claim 10, wherein the PUSCH transmission is not cancelled earlier than a certain time after the ULCI.

13. The method according to claim 10, wherein the cancellation of the PUSCH transmission includes cancellation of symbols of the PUSCH transmission after the group of symbols.

14. The method according to claim 10, wherein the PUSCH transmission is a configured grant PUSCH transmission.

15. The method according to claim 14, further comprising performing an autonomous retransmission in response to cancelling the PUSCH transmission.

16. The method according to claim 10, wherein the PUSCH transmission has high priority if the device is not provided the RRC indication.

17. The method according to claim 10,
   wherein the PUSCH transmission overlaps with an SRS transmission in a set of time frequency resources, wherein the set of time frequency resources does not include any symbol of the group of symbols and any PRB of the group of PRBs, and wherein the method further comprises transmitting an SRS in the set of time frequency resources if the ULCI is sent at least a certain number of symbols prior to the SRS transmission.

18. The method according to claim 10, further comprising transmitting a high priority PUSCH transmission, wherein transmitting the high priority transmission includes at least one selected from rate matching the high priority PUSCH transmission around at least a portion of time frequency resources of the PUSCH transmission that overlaps the indicated group of symbols and the indicated group of PRBs, and puncturing of the high priority uplink transmission in at least the portion of time frequency resources of the PUSCH transmission that overlaps the indicated group of symbols and the indicated group of PRBs.

19. An apparatus comprising:

a controller configured to control operations of the apparatus; and a transceiver coupled to the controller, the transceiver configured to transmit an Uplink Cancellation Indication (ULCI) Downlink Control Information (DCI) with a group-common DCI format for a serving cell, where the ULCI DCI indicates a group of symbols and a group of Physical Resource Blocks (PRBs), wherein the ULCI DCI instructs a User Equipment (UE) to cancel, in response to receiving the DCI, a Physical Uplink Shared Channel (PUSCH) transmission or a Sounding Reference Signal (SRS) transmission on the serving cell if the PUSCH transmission is with low priority based on the UE being provided a Radio Resource Control (RRC) indication indicating ULCI is only applicable to Uplink (UL) transmissions with low priority level, and if the group of symbols includes a symbol of the PUSCH or of the SRS transmission, and if the group of PRBs includes a PRB of the PUSCH or of the SRS transmission.

\* \* \* \* \*